United States Patent [19]
Mathur et al.

[11] Patent Number: 5,924,086
[45] Date of Patent: *Jul. 13, 1999

[54] METHOD FOR DEVELOPING A NEURAL NETWORK TOOL FOR PROCESS IDENTIFICATION

[75] Inventors: Anoop Mathur, Shoreview; Tariq Samad, Minneapolis, both of Minn.

[73] Assignee: Honeywell Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/816,470

[22] Filed: Mar. 13, 1997

Related U.S. Application Data

[63] Continuation of application No. 08/618,002, Mar. 18, 1996, abandoned, which is a continuation of application No. 08/296,270, Aug. 25, 1994, abandoned, which is a continuation of application No. 07/983,102, Nov. 27, 1992, abandoned, which is a continuation of application No. 07/594,927, Oct. 10, 1990, abandoned.

[51] Int. Cl.$^6$ .......................... G06F 15/18; G05B 13/02
[52] U.S. Cl. .................. 706/25; 706/23; 706/906; 364/148.03
[58] Field of Search ............... 395/23, 22, 902, 395/903, 906; 706/23, 25, 52; 364/148.03, 153, 148.02

[56] References Cited

U.S. PATENT DOCUMENTS

| | | | |
|---|---|---|---|
| 4,864,490 | 9/1989 | Nomoto et al. | 706/52 |
| 4,912,647 | 3/1990 | Wood | 706/25 |
| 4,941,122 | 7/1990 | Weideman | 706/20 |
| 5,014,219 | 5/1991 | White | 706/25 |
| 5,023,045 | 6/1991 | Watanabe et al. | 706/20 |
| 5,119,468 | 6/1992 | Owens | 706/23 |
| 5,175,678 | 12/1992 | Fverichs et al. | 706/23 |
| 5,241,651 | 8/1993 | Ueda | 706/52 |
| 5,471,381 | 11/1995 | Khan | 364/148.03 |

OTHER PUBLICATIONS

A. Guez, "Neural Network Architecture for Control," IEEE Control Systems Magazine, pp. 22–25, Dec. 1988.

R. Opitz, "Neural Network Application for Autonomous Mobile Robots," Int'l. Neural Network Conference, vol. 1, pp. 225–228, Jul. 1990.

G. Chryssolouris, et al., "Use of neural networks for the design of manufacturing systems," Manufacturing Review, vol. 3(3), pp. 187–194, Sep. 1990.

Chen et al, "Back–Propagation Neural Networks for Nonlinear Self–Tuning Adaptive Control", IEEE Control System Magazine, 1990.

Sobajic et al, "Robust Control of Nonlinear Systems Using Pattern Recognition", Inter. Conf. on System, Man, and Cybernetics, IEEE 1989.

Widrow et al., "Neural Nets for Adaptive Filtering and Adaptive Pattern Recognition", 1988 IEEE.

"Neural Nets for Adaptive Filtering, and Adaptive Pattern recognition", Widrow et al, 1988 IEEE.

"Back–Propagation Neural Networks for Nonlinear Self-–Tuning Adaptive Control" Chen et al, 1990 IEEE.

"A Multilayered Neural Network Controller" Psaltis et al, 1988 IEEE.

"Modeling Auditory System Nolinearities through Volterra Series", Mammano et al, Biol. Cybern., Mar. 1990.

"Neural Networks for System Identification", S. Reynold Chu, Rahmat Shoureshi and Manoel Tenorio, IEEE Apr., 1990.

*Primary Examiner*—Robert W. Downs
*Attorney, Agent, or Firm*—Ian D. MacKinnon

[57] ABSTRACT

A tool, and the method of making the tool, for process system identification that is based on the general purpose learning capabilities of neural networks. The tool and method can be used for a wide variety of system identification problems with little or no analytic effort. A neural network is trained using a process model to approximate a function which relates process input and output data to process parameter values. Once trained, the network can be used as a system identification tool. In principle, this approach can be used for linear or nonlinear processes, for open or closed loop identification, and for identifying any or all process parameters.

14 Claims, 4 Drawing Sheets

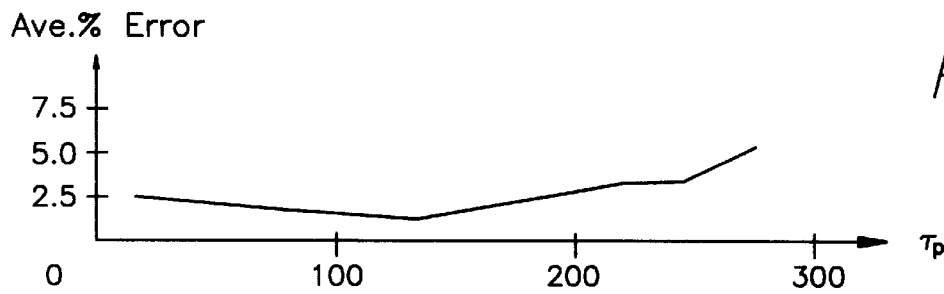

Fig. 8

Error in delay identification as a function of $\tau_p$.
$\Theta_{(actual)}$=250 seconds; $K_p$=1.0; ±5% gaussian noise in process output.

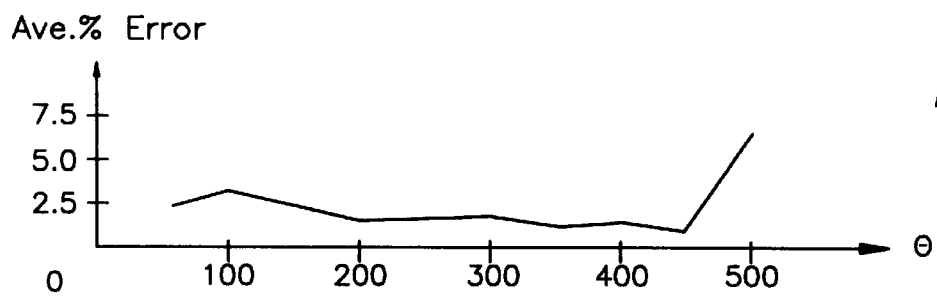

Fig. 9

Error in delay identification as a function of $\Theta$.
$\tau_p$=100 seconds; $K_p$=1.0; ±5% gaussian noise in process output.

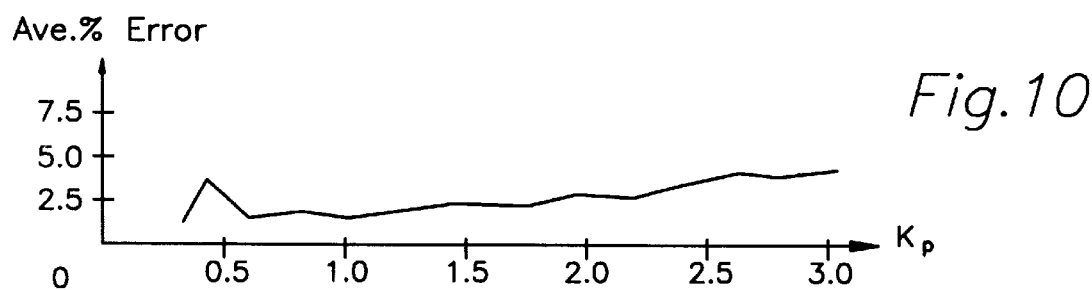

Fig. 10

Error in delay identification as a function of $K_p$.
$\Theta_{(actual)}$=250 seconds; $\tau_p$=100 seconds; ±5% gaussian noise in process output.

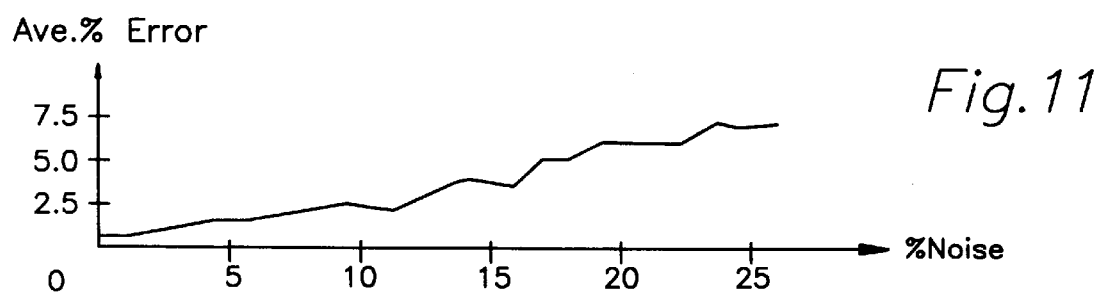

Fig. 11

Error in delay identification as a function of noise.
$\Theta_{(actual)}$=250 seconds; $\tau_p$=100 seconds; $K_p$=1.0.

METHOD FOR DEVELOPING A NEURAL NETWORK TOOL FOR PROCESS IDENTIFICATION

This application is a continuation, of application Ser. No. 08/618,002, filed Mar. 18, 1996, now abandoned, which is a continuation of application Ser. No. 08/296,270, filed Aug. 25, 1994, now abandoned, which is a continuation of application Ser. No. 07/983,102, filed Nov. 27, 1992, now abandoned, which is a continuation of application Ser. No. 07/594,927, filed Nov. 10, 1990, now abandoned.

The invention relates to a neural network tool for process system identification and a method for making the tool.

FIELD OF THE INVENTION

The invention relates more specifically to a general purpose approach for process system identification. System identification is viewed as a function approximation problem, where the inputs to the function are the input and output of the process, and the outputs of the function are estimates of model parameters. This approach, which requires no mathematical analysis, utilizes the learning capabilities of neural networks, and can be used for a wide variety of applications.

BACKGROUND OF THE INVENTION

The identification of model parameters for an unknown or incompletely known process system is important for both control and diagnosis. The more accurately a plant or process can be identified, the better it can be controlled. Estimates of system parameters are an essential aspect of adaptive/predictive control and auto-tuning. In addition, changes in system parameters can be valuable diagnostic indicators. A sudden increase in the delay of a transport process, for example, could imply a blocked pipe.

System identification is the object of extensive research in control theory and a number of techniques have been developed. Most current approaches to system identification can be characterized as hard knowledge approaches derived through extensive mathematical analysis.

A shortcoming of many current system identification approaches is that the assumptions necessary to facilitate the mathematical analysis for a particular application may not be valid for other applications.

A main object of the invention herein is to provide a system identification tool having generality of application. Under this concept, a general purpose technique can be used for a large variety of system identification problems with little or no mathematical effort required. In many applications the short development time that a general purpose technique would allow while still satisfying performance requirements would be a significant advantage.

SUMMARY OF THE INVENTION

In recent years, advances in the field of neural networks have produced learning rules for developing arbitrary non-linear multidimensional real-valued mappings. These learning rules operate on examples of the desired functionality and no programming is required. The simplicity of neural network computational models is also an advantage.

System identification is an extensively researched area of control theory with innumerable applications. When the purpose of the identification is to design a control system, the character of the problem might vary widely depending on the nature of the control problem. In some cases it might be sufficient to have a fairly crude model of the system dynamics. Other cases might require a fairly accurate model of the system dynamics or even a model of the environment of the system.

In most practical problems there is seldom sufficient a priori information about a system and its environment to design a control system from this information alone. It will thus often be necessary to make some kind of experiment involving using perturbations as input signals and observing the corresponding changes in process variables.

A neural network of the type utilized by the invention herein in constructed from two primitive elements which are processing units and directed connections between the processing units. The processing units are densely interconnected with each connection typically having a real valued weight associated with it which determines the effect of the source unit on the destination unit. The output of a processing unit is some function of the weighted sum of its inputs:

$$o_j = f\left(\sum_i w_{ij} o_i + b_j\right) \quad (1)$$

where $o_j$ is the output of unit j, $w_{ij}$ is the weight from unit i to unit j, and $b_j$ is the "threshold" or bias weight for unit j. The quantity $$\sum_i w_{ij} o_i + b_j$$

is usually referred to as the net input to unit j, symbolized $net_j$.

Processing units are often arranged in layers. In many applications the networks are constrained to be acyclic and the connections are constrained to lie between adjacent layers. A multilayer feed forward network of this type can realize any mapping from a multidimensional continuous input space to a multidimensional continuous output space with arbitrarily high accuracy.

Many continuous processes have process delays generally due to transport of fluids. In these processes a conventional feedback controller would provide unsatisfactory closed-loop response. A controller which can compensate for delay is required to achieve good control of the process. Delay compensation techniques, such as the Smith Predictor (an example of which can be found in the work of Stephanopoulos, G. (1984); Chemical Process Control: An Introduction to Theory and Practice; Prentice Hall Publishers) require estimates of the process delay.

A further object of the invention herein is to provide a new technique for process delay identification which is an open loop identification technique based on a learning neural network approach.

Existing techniques for delay identification are based on extensive mathematical analyses. A major advantage of the technique herein is that it uses a general purpose neural network learning architecture for which no mathematical analysis of the problem is needed before implementing a neural network delay identifier.

Other objects and advantages of the invention will become apparent from the following specification, appended claims, and attached drawings.

DESCRIPTION OF DRAWINGS

In the drawings:

FIG. 8 is a graph showing error in delay identification as a function of $\tau_p$;

FIG. 9 is a graph illustrating error in delay identification as a function of $\theta$;

FIG. 10 is a graph of error in delay identification as a function of $K_p$; and

FIG. 11 is a graph of error in delay identification as a function of noise.

DESCRIPTION OF PREFERRED EMBODIMENT

Figure 1:
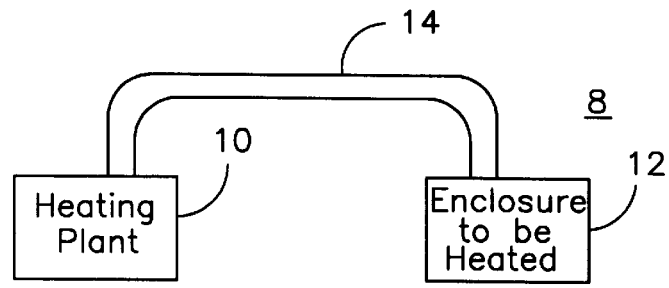
FIG. 1 shows a schematic representation of a prior art type heating system for which parameters thereof, such as the time delay parameter, may be identified with the use of the parameter identification tool of the present invention.

With reference to the drawings, FIG. 1 shows a schematic representation of a prior art heating system 8 which is a type of system for which parameters thereof such as the time delay parameter may be identified with the use of a parameter identification tool to which the invention pertains. The illustrated heating system comprises a heating plant 10 such as a gas furnace, at least one enclosure 12 to be heated by the furnace, and conduit means 14 for conveying a heated gas or liquid from the furnace to the enclosure.

Figure 2:
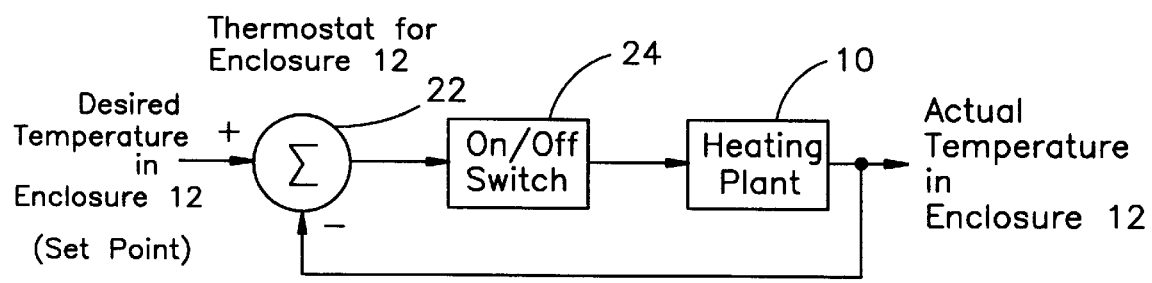
FIG. 2 shows a prior art type closed-loop temperature control system for controlling the temperature of the heating system of FIG. 1.

FIG. 2 shows a prior art type closed loop temperature control system 20 for controlling the temperature of the enclosure 12. The control system 20 has a thermostat 22 and an on/off type switch 24 in the loop with the heating plant 10.

A heating system 8 can be approximated with a first order process with delay which includes a number of operating parameters including a time constant $\tau_p$, a process gain $K_p$ and a time delay $\theta$.

The time constant $\tau_p$, which may be on the order of 10 to 200 seconds, relates to the rate at which the enclosure 12 is heated and depends primarily on the sizes of the heating plant 10 and the characteristics of the enclosure.

The process gain $K_p$ may be on the order of 0.5 to 1.5, which is the ratio of process output to process input at steady state.

The delay $\theta$, which may be on the order of 0 to 500 seconds, relates to the transport time of the heating medium in the conduit means 14 as it flows from the heating plant 10 to the enclosure 12 and depends mainly on the length and flow resistance of the conduit means 14.

In certain installations in which the time delay parameter $\theta$ of the conduit means 14 is relatively large, the controller 20 of FIG. 2 will not be appropriate because erratic operation will occur by reason of the controller not being responsive to the time delay parameter. What would happen is that there would be a lagging effect wherein the heated medium would not reach the enclosure until a substantial time after the thermostat begins calling for heat. After the desired temperature is reached, the plant 10 would be turned off but thereafter there would be an overshoot of the set point temperature wherein the heated medium (air, for example) would continue to be supplied to the enclosure. This would cause overheating.

Figure 3:
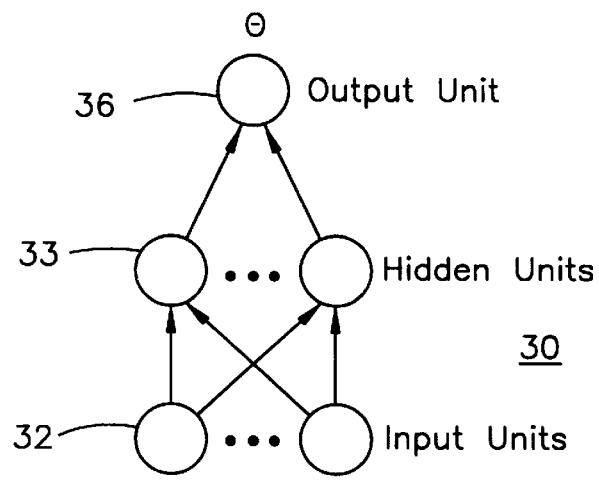
FIG. 3 is a schematic diagram illustrating a neural network which can be trained in accordance with the invention to be used as a system identification tool.

There are a number of neural network models and learning rules that can be used for implementing the invention. A preferred model is a three-layer feed-forward network 30 as shown in FIG. 3 and a preferred learning rule is the back-propagation learning rule. Back-propagation is a supervised learning procedure for feed-forward networks wherein training examples provided to the network indicate the desired network output or target for each example input.

Feed-forward networks, as used with back-propagation, comprise an input layer of processing units 32, zero or more hidden layers of processing units 33, and an output layer which may have only one processing unit 36. In the illustrated embodiment the output processing unit 36 outputs the process delay value $\theta$ computed by the network 30. All the processing units output real values.

The back-propagation learning technique performs gradient descent in a quadratic error measure to modify network weights. The form of Eq. (1) that is usually employed with back-propagation is the sigmoid function:

$$f(x) = \frac{1}{1+e^{-x}} \tag{2}$$

Back-propagation is usually used with multilayer feed-forward networks of the type shown in FIG. 3 which is an example of a three-layer network 30 with one output unit.

The rule used to modify the weights may be:

$$\Delta w_{ij} = \eta o_i \delta_j \tag{3}$$

where $\eta$ is a constant that determines the learning rate, and $\delta_j$ is the error term for unit j ($o_i$ is defined as in Eq. 1). $\delta_j$ is defined differently for output and hidden units. For output units, $$\delta_j = o_j'(t_j - o_j) \tag{4}$$

where $o_j'$ is the derivative of $o_j$ with respect to its net input (for the activation function of Eq. (2), this quantity is $o_j(1-o_j)$) and $t_j$ is the target value (the "desired output") for unit j. For hidden units, the target value is not known and the error term is computed from the error terms of the next "higher" layer:

$$\delta_j = o_j' \sum_k w_{jk} \delta_k \tag{5}$$

Figure 4:
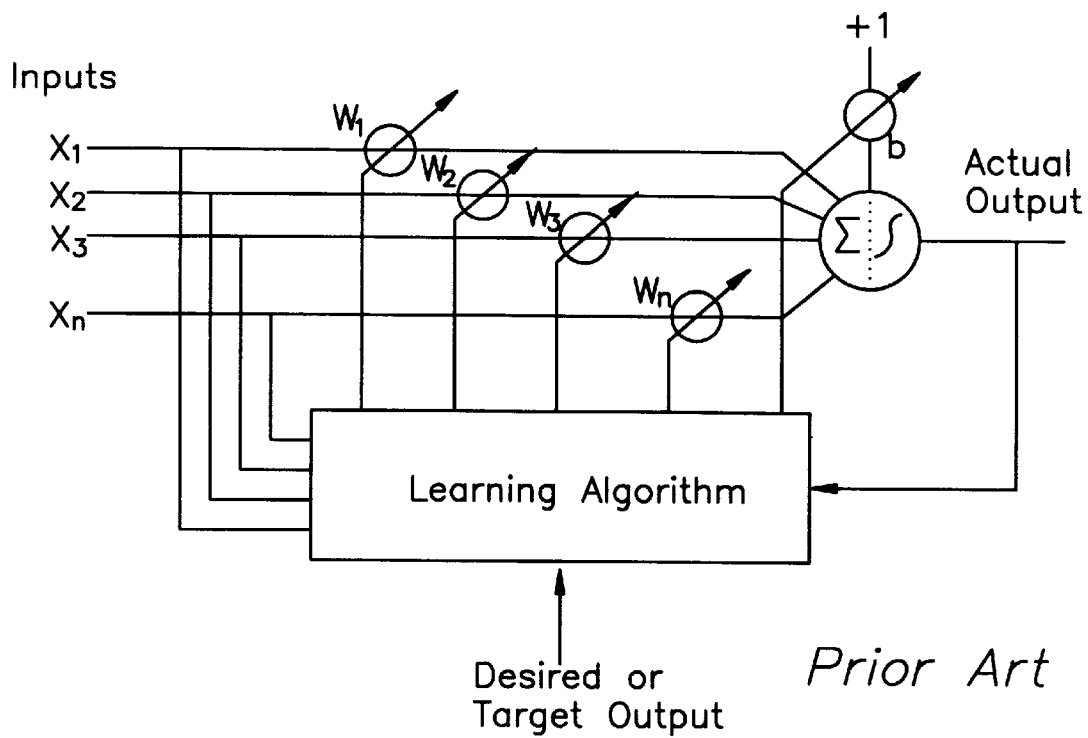
FIG. 4 is a block diagram showing a prior art adaline type of processing element which may be used for the neural network of FIG. 3.

FIG. 4 shows a prior art adaline type processing element which could be the general design for the hidden and output processing elements 33 and 36 of the network of FIG. 3. The processing element 36 has a series of trainable weights $w_1$ to $w_n$ with a threshold or bias weight b being connected to a fixed input of +1.

FIG. 4 shows an arrangement for an output processing element where the desired or target output pursuant to equation (4) is available for the learning algorithm. The arrangement for hidden units for which the desired or target output is not available is pursuant to equation (5).

For the exercise of this invention, a mathematical model of a system, containing one or more parameters, is necessary (FIG. 1). It is assumed that the processes for which the system identification tool is intended can be modeled with appropriate accuracy for the intended use by the mathematical model, for some specific assignments of the model parameters. It is also assumed that ranges for all model parameters can be specified. This assumption is not expected to pose practical problems, since extremely broad ranges can be used. Even if some parameter values that may be encountered are excluded, the robustness properties of neural networks render it likely that any resulting loss of accuracy will be small. In simple cases, or when little is known about the target processes, a range can consist of a lower limit and an upper limit, and all values within the range can be considered equally probable. In more complex cases and when adequate process knowledge exists, the ranges can be more sophisticated—the probability distribution over the range need not be uniform, or even unimodal.

The tool and method development herein is based on a neural network approach having a two phase procedure. In the first phase a mathematical model of the system shown in FIG. 1 is utilized for generating training data. The mathematical model is implemented as a computer program. The training data comprises examples of open loop responses to a step input given to the system model. (Equivalent procedures with impulse or ramp input functions, or even arbitrary input functions, could also be utilized.) Each example is generated with a unique set of parameter values, each value within the set being chosen from the range specified for the parameter.

In the second phase the training data is applied in a teaching or learning mode to a neural network of an appropriate type, such as the network 30, to transform or convert the network into a tool for identifying at least one of the parameters such as the time delay parameter θ.

With reference to the second phase, the learning rule is "supervised" learning in which it is assumed that the "desired output" for every training input is known. Supervised learning can be used to train an appropriately configured neural network such as network 30 for some specific task by providing examples of desired behavior.

The concept of neural network based system identification is illustrated herein as being embodied in a prototype delay identification tool 30. More specifically, it is a neural network delay identifier for the open loop estimation of process delays for a linear first order process model.

The system shown in FIG. 1 may be modeled as a linear first order process with delay by the equation:

$$\frac{d}{dt}x(t) = -\frac{1}{\tau_p}x(t) + \frac{K_p}{\tau_p}u(t-\theta) \tag{6}$$

wherein x(t) is the process temperature response in the enclosure 12, $\tau_p$ is the time constant of the process, $K_p$ is the process gain, and θ is the process delay. $K_p$, $\tau_p$ and θ are the parameters of the model.

The modeling equation may be a linear or nonlinear differential equation, or an algebraic polynomial equation, within the scope of the invention.

Figure 5:
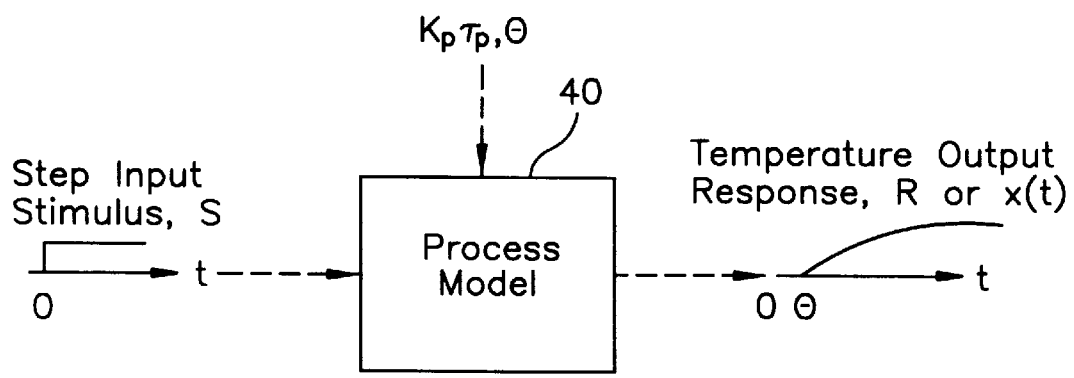
FIG. 5 is a block diagram illustrating an arrangement for using a process model for generating training examples for training the network shown in FIG. 3.

In the first phase referred to above, training examples are generated using a process model 40 as shown in FIG. 5. The process model, with its parameters assigned to values within predetermined ranges, is given a step input S. The process temperature response output R or x(t) is sampled at some predetermined rate and the resulting real valued vector and the respective values of the time delay θ are used as the training input for the neural network 30 as shown in FIG. 6.

Figure 6:
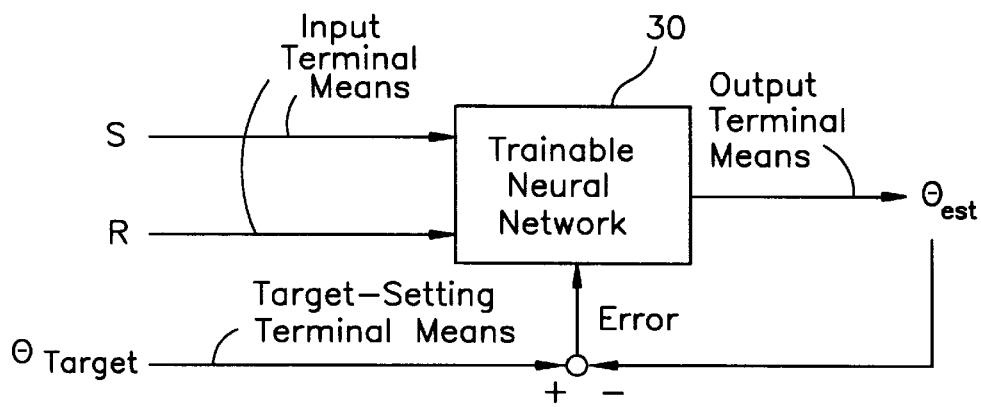
FIG. 6 is a block diagram showing an arrangement for using training examples to train the network of FIG. 3.

Although FIG. 6 designates a process input S, it will be understood that such input may be omitted in cases where S is a constant because it would only be varying values of S that would affect the output of the neural network.

Identification is in terms of samples, not absolute units of time. By changing the sampling rate, the range of delays that can be identified (by the same trained network) can be controlled. If the minimum delay is known to be n seconds, sampling may start n seconds after the step input is given. The desired network output would then be θ-n and n would be added to the output of the trained network to obtain the estimated process delay.

Numerous situations of training and operation to evaluate the system have been run. Our simulations fall into two classes. First, we have investigated the error of delay estimation over wide ranges of process parameters. Second, we have simulated the set-up of FIG. 7 and demonstrated the improved control that can be achieved using our delay identifier. The results described below employed a three-layer network with 15 hidden units.

In one such simulation the training data for the network 30 consisted of 6,000,000 dynamically generated examples. The ranges of parameters considered were $\tau_p$ from 10 to 200 seconds; θ from 0 to 500 seconds; and $K_p$ from 0.5 to 1.5. Uniform distributions were used for all ranges.

Training on a range of $K_p$ values is not strictly necessary if the correct value is available in operation. As the process model is linear, the process output can easily be normalized. However, without training on a range of $K_p$, even small changes in the value of this parameter can result in significant error in delay estimation. The noise in training inputs was gaussian with 99% (3 standard deviations) falling within ±5% of the range of process output values, which was normalized between 0 and 1. The output of the process was sampled every 10 seconds after the step input was given. 50 samples were collected and used as input to the network.

During the generation of training data via process model 40, each vector of 50 samples had one set of values of the parameters $\tau_p$, θ and $K_p$ associated with it. During the training of the network 30, each such vector of 50 samples had the respective value of the time delay θ associated with it, which in each case was the target value for adjusting the weights of the network.

The network 30 had 50 input units (one for each sample), 15 hidden units and 1 output unit (the delay estimate). The value of the learning rate parameter η was 0.1 for the first 1,000,000 training iterations, and 0.01 thereafter.

After training, the network 30 was tested on new (also randomly generated) data. Tests were performed to determine the effectiveness of delay identification as a function of delay, as a function of $\tau_p$, and a function of $K_p$, and as a function of the amount of noise. A noise figure of, say, 5 percent implies that 99 percent of the gaussian noise (±3 standard deviations) was within ±5 percent of the range of process output for that simulation.

FIGS. 8 through 11 depict the results of various tests. Each of these graphs shows the estimation error over a range of values of a particular parameter. The remaining parameters were held constant at or near the midpoints of their ranges.

Based on these tests, the following observations were made:

The average estimation error is within 2.5 percent over a wide range of delays and process time constants for realistic amounts of noise.

For parameter values within training ranges, estimation error is small. There is one major exception. For very small delays, percentage error is large. This is to be expected. The sampled process output in this case provides little relevant data. It is likely that a non-uniform sampling range would overcome this problem.

In many cases, estimation error is acceptable even for parameter values outside training ranges. For example, the average error for $\tau_p=280$ less than 4%. Even for gains twice as high as any the network was trained on, the average error is around 4%. Estimation is robust with respect to noise. For 25% noise, the average error is about 6.5%.

After the network 30 has been trained, it can be used for on-line delay identification. The input to the network is now actual (not simulated) process output but the output of the network is again a delay estimate. This delay estimate can then be used for control and/or diagnostics. For example, if the process controller incorporates a Smith Predictor or other delay compensation technique, the delay estimate can be given as input to it.

Figure 7:
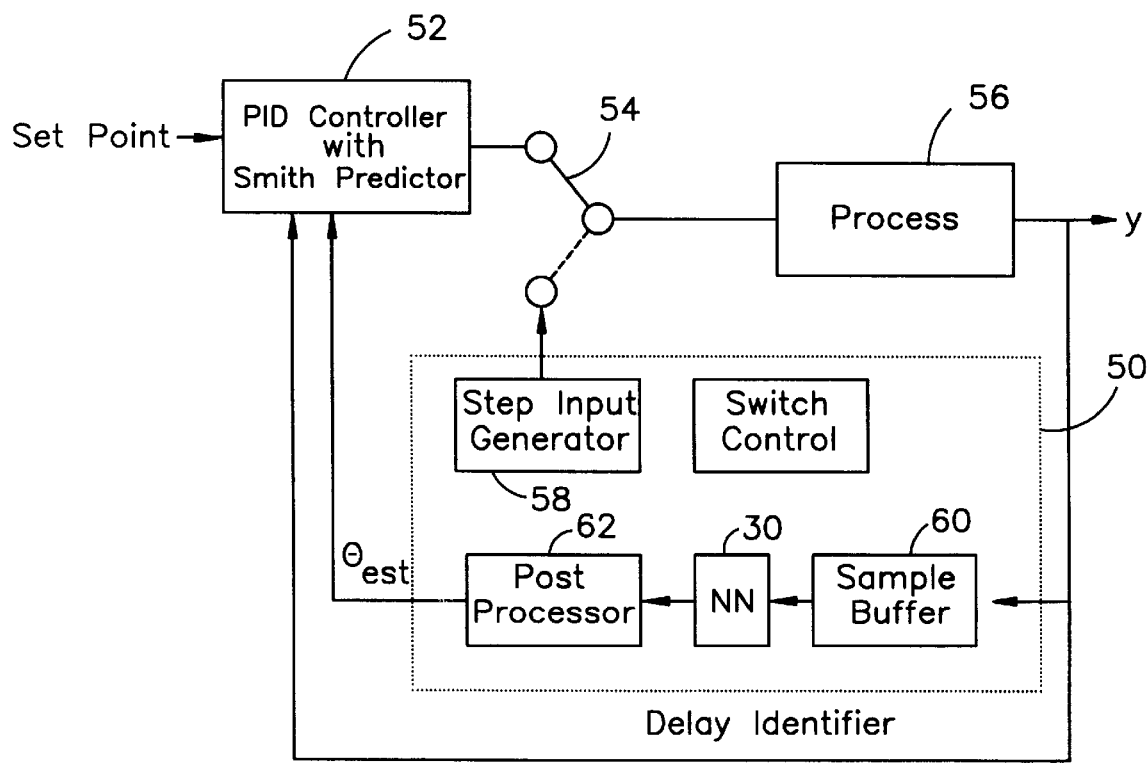
FIG. 7 is a block diagram showing the use of a neural network which has been trained to function as a system identification tool for the time delay identification of a process.

FIG. 7 depicts how delay identifier 50 embodying the network 30 can be applied to a unit 52 which comprises a PID controller having an associated Smith Predictor. When a delay estimate is needed, the control loop is broken via a switch 54 and a (small) step input perturbation is applied to a process 56 thereof being controlled, by unit 52, via step input generator 58. The response of the process 56 to the perturbation is sampled and stored in a buffer 60. When a sufficient number of samples have been received, the vector of samples (scaled appropriately) is used as input to the trained neural network 30. The output of the network is subjected to some post processing (scaling and/or translation) in a post processor 62 to obtain a delay estimate $\theta_{est}$. Once the delay estimate has been input to the Smith Predictor, switch 54 may be closed again and the process put back under closed loop control.

A simulated set-up of FIG. 7 has been utilized to investigate the effect on closed loop control of delay identification. A first order process and a simple proportional controller were used for the simulation. It was found that significantly better control is achieved with a good knowledge of the process delay.

The process delay is just one process parameter. Although estimates of time constants, gains, etc. are also required for control, it has been found that the process delay is the most critical parameter. Significant over or under estimates in process delay can cause worse control than proportionately poor estimates in the process time constant or the process gain.

CLOSED LOOP IDENTIFICATION

The approach herein for developing system identification tools is extremely general-purpose. It can be used for closed loop or open loop identification, for estimating any and all model parameters, and for linear and non-linear process models. For specific applications, simplification may be possible. For example, if the identification technique is an open loop one, the input perturbation can be identical for all training examples. It then need not be provided as input to the network 30. The constraint this imposes is that the same input perturbation, or (if the process model is linear) a scaled version of it, must be used during the operation.

The description of the invention herein has for the most part been directed to open loop system identification. That is, it is assumed that an input can be given to the process and its response observed without the confounding effects of feedback. A simplified but realistic form of closed loop delay identification has also been considered, however.

The essence of the invention is the approximation of a function from process input/output to parameter value estimates. For general closed loop identification, estimates have to be produced given continuously (and unpredictably) varying inputs. In principle, there appears to be no reason why a network could not be trained for this case as well; neural networks have been used to approximate functions as complex as chaotic time series. A simulation of the process under closed loop control could be used.

We have investigated a constrained form of closed-loop identification: delay identification under "bang-bang" control. In closed-loop bang-bang control, the process can be switched on or off. Whenever the output exceeds an upper bound, the process is turned off; whenever the output falls below a lower bound, the process is turned on. Bang-bang control is commonly used when highly accurate control is not required—e.g., in HVAC systems.

For delay identification under bang-bang control, we assume that the collection of output samples is initiated when the process is turned on. After the predetermined number of samples have been collected, an estimate is produced. Given this scenario, there is only one significant difference between open-loop and bang-bang delay identification: In the former case, the process is assumed to be at a constant value (except for noise) from when the step input is given until the delay expires; in the bang-bang case, the process output is decaying during the delay. The decaying and rising responses can be governed by different dynamics.

We have trained a network to identify the delay of a process under bang-bang control. It was assumed that both the "on" process and the "off" process were first-order with independent (and therefore different) time constants. The process input was again constant over the duration of a training example and was not provided to the network. An average error rate of around 7% was achieved in 100,000 iterations. The network converges significantly faster than for the open-loop delay identification, and we expect that a comparably long simulation would produce lower error rates. The better performance in the bang-bang closed-loop case is not too surprising: a transition between falling and rising curves is easier to detect than a transition between constant and rising curves.

It is claimed:

1. A method for developing a tool for identifying at least one parameter of a process—wherein said parameter is characterized as a constant in an equation defining a mathematical model of said process—;said tool capable of providing a signal representative of values of said at least one parameter which is recognized by a controller of said process, said method comprising the steps of:

determining ranges for each of said at least one parameter;

modeling said equation via a computer program;

utilizing said program to generate a set of training examples, each of said examples having (1) selected values of said at least one parameter from within said respective ranges and (2) process model output data resulting from said program when a process model input is provided to said process model for said selected values of said at least one parameter; and training an artificial neural network on said set of training examples by: (1) providing an input to said network comprising for each of said training examples respective values of at least said process model output data; and (2) the output of said network comprises respectively for each of said training examples estimates of at least one of said selected values of said at least one parameter, said signal being in a form recognizable by said controller as an indicator of a present value of a process model parameter so that said controller effectuates changes to the process based on such input.

2. The method according to claim 1 wherein said equation is a linear differential equation.

3. The method according to claim 1 wherein said equation is a nonlinear differential equation.

4. The method according to claim 1 wherein said equation is an algebraic polynomial equation with said parameters being represented as coefficients of said polynomial equation.

5. The method according to claim 1 wherein the input to said network further comprises said process model input.

6. The method according to claim 5 wherein said process model input includes varying values of said process model input data.

7. The method according to claim 1 wherein said equation has the form:

$$\frac{d}{dt}x(t) = -\frac{1}{t_p}x(t) + \frac{K_p}{t_p}u(t-\theta)$$

wherein x(t) is the process model output response, $t_p$ is a time constant parameter of the equation, $K_p$ is a gain parameter of the equation and θ is a delay parameter of the equation.

8. A neural network tool developed by a method for developing a tool for identifying at least one parameter of a process—wherein said parameter is characterized as a constant in an equation defining a mathematical model of said process—;said tool capable of providing a signal representative of values of said at least one parameter which may be recognized by a controller of said process; comprising the steps:

determining ranges for each of said at least one parameter;

modeling said equation via a computer program;

utilizing said program to generate a set of training examples, each of said examples having (1) selected values of said at least one parameter from within said respective ranges and (2) process model output data resulting from said program when a process model input is provided to said process model for said selected values of said at least one parameter; and training an artificial neural network on said set of training examples by: (1) providing an input to said network comprising for each of said training examples respective values of at least said process model output data; and (2) the output of said network comprises respectively for each of said training examples estimates of at least one of said selected values of said at least one parameter, said signal being in a form recognizable by said controller as an indicator of a present value of a process model parameter so that said controller may effectuate changes to the process based on such input.

9. The neural network tool developed by the method according to claim 8 wherein said equation is a linear differential equation.

10. The neural network tool developed by the method according to claim 8 wherein said equation is a nonlinear differential equation.

11. The neural network tool developed by the method according to claim 8 wherein said equation is an algebraic polynomial equation with said parameters being represented as coefficients of said polynomial equation.

12. The neural network tool developed by the method according to claim 8 wherein the input to said network further comprises said process model input.

13. The neural network tool developed by the method according to claim 12 wherein said process model input includes varying values of said process model input data.

14. The neural network tool developed by the method according to claim 8 wherein said equation has the form:

$$\frac{d}{dt}x(t) = -\frac{1}{t_p}x(t) + \frac{K_p}{t_p}u(t-\theta)$$

wherein x(t) is the process model output response, $t_p$ is a time constant parameter of the equation, $K_p$ is a gain parameter of the equation and θ is a delay parameter of the equation.

* * * * *